United States Patent
Booth (10) Patent No.: US 10,488,206 B2
(45) Date of Patent: Nov. 26, 2019

(54) METHOD AND SYSTEM FOR IMPROVING SPATIAL ACCURACY OF MAP DATA

(71) Applicant: Ordnance Survey Limited, Southampton, Hampshire (GB)

(72) Inventor: Peter Booth, Southampton (GB)

(73) Assignee: Ordnance Survey Limited, Southampton, Hampshire (GB)

( * ) Notice: Subject to any disclaimer, the term of this patent is extended or adjusted under 35 U.S.C. 154(b) by 199 days.

(21) Appl. No.: 15/682,658

(22) Filed: Aug. 22, 2017

(65) Prior Publication Data

US 2018/0066946 A1 Mar. 8, 2018

(30) Foreign Application Priority Data

Sep. 7, 2016 (EP) ..................... 16187594

(51) Int. Cl.
| | | |
|---|---|---|
| *G01C 21/32* | (2006.01) | |
| *G06T 7/33* | (2017.01) | |
| *G01S 19/41* | (2010.01) | |
| *G01S 19/51* | (2010.01) | |
| *G06K 9/00* | (2006.01) | |
| *G06K 9/62* | (2006.01) | |

(52) U.S. Cl.
CPC .............. *G01C 21/32* (2013.01); *G01S 19/41* (2013.01); *G01S 19/51* (2013.01); *G06K 9/00* (2013.01); *G06K 9/00476* (2013.01); *G06K 9/00483* (2013.01); *G06T 7/33* (2017.01); *G06K 9/6211* (2013.01)

(58) Field of Classification Search
CPC ........... G06K 9/00476; G06K 9/00483; G06K 9/6201; G06K 9/6202; G06K 6/6215; G06T 3/0068; G06T 7/33; G06T 2207/20221; G01C 21/32; G09B 29/106
See application file for complete search history.

(56) References Cited

U.S. PATENT DOCUMENTS

| | | | | |
|---|---|---|---|---|
| 6,163,749 A | * | 12/2000 | McDonough et al. | ..................... G01C 21/367 340/995.14 |
| 2011/0316854 A1 | * | 12/2011 | Vandrovec | ............ G06T 17/005 345/420 |
| 2015/0242674 A1 | | 8/2015 | Ahmed et al. | |

OTHER PUBLICATIONS

Ashok, Samal et al., "A Feature-Based Approach to Conflation of Geospatial Sources," International Journal of Geographical Information Science, vol. 18, No. 5, Jul.-Aug. 2004, pp. 459-489.
Mar. 27, 2017—(EP) Extended Search Report—App 16187594.3.

* cited by examiner

*Primary Examiner* — Andrew W Johns
(74) *Attorney, Agent, or Firm* — Banner & Witcoff, Ltd.

(57) ABSTRACT

Aspects described herein address the above noted problems by providing a way of more accurately quantifying the spatial similarity between a feature in a first map and features in one or more further maps, specifically, by quantifying the extent to which the areas surrounding the features intersect. Some aspects described herein use this similarity test to spatially resolve two or more maps to produce a composite image of a map that comprises all of the features of both maps, wherein the features common to both maps have been spatially resolved.

20 Claims, 9 Drawing Sheets

Prior Art

Figure 1a

Prior Art

METHOD AND SYSTEM FOR IMPROVING SPATIAL ACCURACY OF MAP DATA

TECHNICAL FIELD

Aspects described herein relate to computer implemented methods and systems for improving the spatial accuracy of map data. In particular, aspects relate to computer implemented methods and systems for improving the spatial accuracy of map data by quantitatively matching alternative sets of map data relating to the same geographical area.

BACKGROUND

Most providers of digital maps rely on a very detailed topographical map database which stores the underlying data. For example, Ordnance Survey uses a very large scale topographic product OS MasterMap™, which records every feature larger than a few metres in one continuous dataset, and is constantly being updated. The OS MasterMap™ product is composed of discrete vector features, each of which has the feature type, geometry, and various feature attributes. The OS MasterMap™ product is recognised as being one of the most accurate and nationally consistent set of these discrete vector features.

To improve the accuracy of third party map data or other new map products, or conversely to improve the topographical data of the map provider itself, it is desirable to compare and combine the topographical data stored in a geographic information system (GIS) with third party map data, which may be less or more spatially accurate. Such third party data may also include map data relating to features not already stored in the GIS, or it may be missing map data relating to features that are stored in the GIS. For example, where the topographic features represent rail lines, map data from the organisation that built the rail network may be more accurate and up to date than that stored in the map provider's database (or vice versa).

One reason for doing this is that the accuracy of the apparent location of a feature as recorded in the topographical map database or the third party data is dependent on a number of different factors that can lead to inconsistencies in the map data. For example, errors in the map data may be due to undefined feature boundaries caused by the surrounding terrain, for example, trees covering paths, or by errors in the measuring instruments used to generate the map data. It is also common for errors to occur where there are multiple features within an area that are spatially very similar, for example, a road network, to the extent that the visual resolution of the measuring instruments is not high enough to distinguish between the those features, This is particularly the case for line features such as paths, tracks, cycle routes, rail lines, highways and the like, as such features tend to be of extreme length which are often difficult and impractical to field check. Furthermore, for features such as railways and highways that are often subject to frequent change, it is not uncommon for the topographical data stored in the GIS system to be incorrect. Therefore, it is desirable for the GIS system creating the map to compare third party attribution to the stored data and, where appropriate, spatially resolve the two map datasets to obtain a more accurate and up to date representation of those features. Similarly, it may be the topographical data stored in the GIS system of the map provider that is the most accurate and up to date, in which case a third party may wish to use the topographical map data stored in the GIS system to improve their own map data.

Previous methods of spatially matching topographical map data include a standard intersection method, wherein features produce a match result if they are found to intersect at any point. Such a method is shown in FIG. 1, wherein a reference feature 10 is compared with three test features 12, 14, and 16. The outcome of this intersection query, as shown by FIG. 1b, is a match against test feature 16 as this is the only test feature that intersects with the reference feature 10. This result is not a good match as it clearly does not relate to the same vector feature. Therefore, this intersection method does not provide a reliable method of matching multiple data sets. This is a particular problem for topographical map data where it is common for features to be overlapping, for example, in a rail or highway network.

Figure 2A:
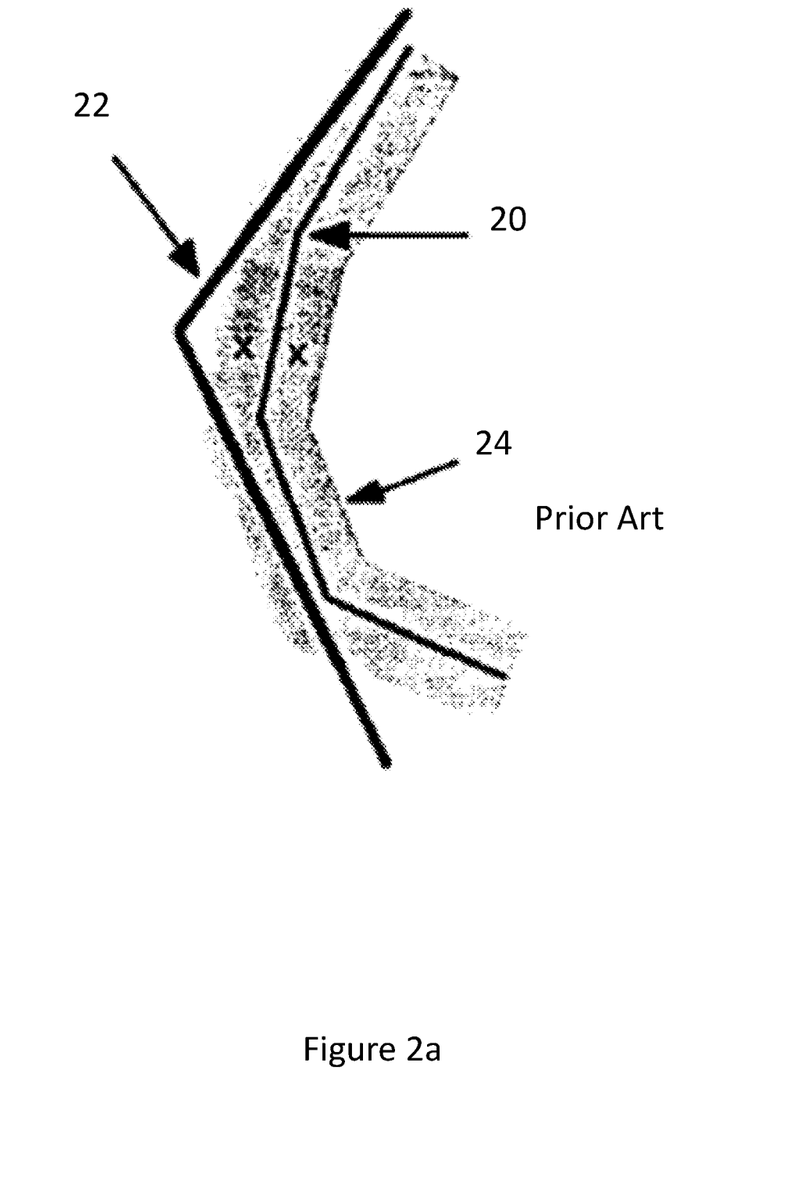

Another method of spatially matching topographical map features, which aimed to address the problems of the above described method, is that proposed in "*A simple positional accuracy measure for linear features*", M F Goodchild and G J Hunter, Int. J. Geographical Information Science, 1997, volume 11, no. 3, pages 299-306. With reference to FIG. 2a, this paper proposed a method wherein a buffer 24 of width x was placed around a reference source feature 20, the proportion of a test feature 22 lying within that buffer 24 being calculated as a percentage. The problem with this method, as will be described in more detail below, is that if there is more than one test feature and those test features are very similar (i.e. a similar proportion of the feature lies within the buffer), it is still hard to decipher which of those test features is the more accurate spatial match. Again, this is particularly problematic for areas of maps that are largely populated by spatially similar topographical map features such as rail and highway networks.

Therefore, an approach to spatial matching which can provide a more precise measure of the accuracy of topological map features is required to thereby enable multiple maps to be spatially resolved and combined.

SUMMARY

Aspects described herein address the above noted problems by providing a computer-implemented way of more accurately quantifying the spatial similarity between features in a first map and features in one or more further maps, by quantifying the extent to which respective areas surrounding the features intersect. The described aspects and embodiments use this similarity test to spatially resolve two or more maps to produce a composite image of a map that comprises all of the features of both maps, wherein the features common to both maps have been spatially resolved so as to be represented by a single feature.

In a first illustrative aspect, a computer implemented method for combining two or more maps is provided, the method comprising receiving map data relating to a first map comprising one or more features and map data relating to a second map comprising one or more features, performing a spatial matching test to identify one or more features of the first map that are present in the second map, the test comprising the steps of (i) identifying a first feature from the first map, wherein the first feature is representative of a first geographical configuration (ii) identifying a second feature from the second map, wherein the second feature is representative of a second geographical configuration, (iii) adding a first buffer area around the first feature, (iv) adding a second buffer area around the second feature, (v) calculating a first similarity measure based on the amount of overlap between the first buffer area and the second buffer area, and (vi) determining whether the first and second features relate to the same geographical configuration in dependence on the first similarity measure, and wherein the method further comprises generating a composite map image, wherein the features of the first map are spatially resolved with the features of the second map based on the determination of the spatial matching test.

As such, two or more maps can be overlaid and combined such that all of the features contained within the first map and the second map are included in a single composite map. Where features in the second map are found to be a spatial match to features in the first map, that is, they are common features, these features are spatially resolved to ensure that they are accurately represented on the composite map image.

The spatial resolution is such that, upon determining that the first and second features relate to the same geographical configuration, the first and second features are represented as a single feature on the composite map image. That is to say, if the first and second features are found to be spatial matches, then only one representation of that feature is required on the composite map image.

In one arrangement, the geographical position of the single feature on the composite map image is the original geographical configuration represented by the first or second feature on the first or second map respectively. That is to say, the feature is effectively re-written so that it is identical to the shape and geographical position as it is represented on either the first or second map, preferably whichever is known to be more accurate.

Alternatively, the geographical configuration of the single feature on the composite map image is a mean of the original geographical configurations represented by the first and second feature on the first and second maps respectively. That is to say, the feature is effectively re-written so that the shape and geographical position is an average of what is given on the first and second map.

In another arrangement, the spatial resolution is such that, upon determining that the first and second features do not relate to the same geographical configuration, the first and second features are represented as separate features on the composite map image based on their original geographical configurations on the first and second map respectively. That is to say, the composite map image will include two features that are identical to the first and second features as represented on the first and second map.

The spatial matching test may further comprise spatially aligning the first map with the second map based on at least one known geographical position as a reference point. This allows the first and second map to be accurately overlaid prior to any spatial matching. For example, known trig points that have been accurately surveyed and which are represented on the two maps may be used as reference points.

The second feature may be determined to have the same geographical configuration as the first feature if the similarity measure is above a predetermined level, wherein the predetermined level may be at least 65%. Preferably, the predetermined level is above 80%.

The first buffer area may have a first width, wherein the first width may be selected in dependence on a property of the first feature, for example, the size of the first feature in at least one dimension. This helps to ensure that the buffer area is not too large or small for the features being tested which can result in either too many, or conversely, no positive spatial matches.

In one arrangement, the second buffer area may have a second width, wherein the second width may be selected in dependence on a property of the second feature, for example, the size of the second feature in at least one dimension. As such, the buffer area of the second feature does not need to be the same size as the buffer area of the first feature. This may be useful, for example, where the first map and second map are of different scales and one map has been digitised to a lower order of accuracy. Alternatively, the second buffer area may have the same width as the first buffer area.

The spatial matching test may further comprise identifying a third feature from the second map or a third map, adding a third buffer area around the third feature, calculating a second similarity measure based on the amount of overlap between the first buffer area and the third buffer area, comparing the second similarity measure to the first similarity measure to determine if the second feature or the third feature is closer in geographical configuration to the first feature, and spatially resolving the first, second and third features based on the comparison.

As such, the first feature may be compared with more than one feature taken from the second map, for example, if there is more than one similar features within a particular geographical region, or from a further map, for example, where there are multiple map datasets relating to the same geographical region. In doing this, the feature which is the closest spatial match can be determined. If the third feature is found to be a closer spatial match to the first feature, that is, it has a higher similarity measure, then the first feature may be spatially resolved with the third feature and represented as a single feature on the composite map image. If the second feature is then not found to be a spatial match with any feature on the first map, then the second feature may be added to the composite map image as it is represented on the second map. In the case that the third feature is from a third map, and both the second and the third features are found to have the same resulting similarity measure, that is, they relate to the same feature, then all three features may be spatially resolved and represented as a single feature on the composite map.

In some arrangements, the features of the first and second map represent at least one of: paths, tracks, cycle routes, rail lines or highways.

Another illustrative aspect provides a non-transitory computer program product for a data-processing device, the computer program product comprising a set of instructions which, when loaded into the data-processing device, causes the device to perform the steps of receiving map data relating to a first map comprising one or more features and map data relating to a second map comprising one or more features, performing a spatial matching test to identify one or more features of the first map that are present in the second map, the test comprising the steps of (i) identifying a first feature from the first map, (ii) identifying a second feature from the second map, (iii) adding a first buffer area around the first feature, (iv) adding a second buffer area around the second feature, (v) calculating a first similarity measure based on the amount of overlap between the first buffer area and the second buffer area, and (vi) determining whether the first and second features relate to the same geographical configuration in dependence on the first similarity measure, and wherein the method further comprises generating a composite map image, wherein the features of the first map are spatially resolved with the features of the second map based on the determination of the spatial matching test.

Another illustrative aspect provides a map image processing system, comprising a processor, and a computer readable medium storing one or more instruction(s) arranged such that when executed the processor is caused to perform the steps of receiving map data relating to a first map comprising one or more features and map data relating to a second map comprising one or more features, performing a spatial matching test to identify one or more features of the first map that are present in the second map, the test comprising the steps of (i) identifying a first feature from the first map, (ii) identifying a second feature from the second map, (iii) adding a first buffer area around the first feature, (iv) adding a second buffer area around the second feature, (v) calculating a first similarity measure based on the amount of overlap between the first buffer area and the second buffer area, and (vi) determining whether the first and second features relate to the same geographical configuration in dependence on the first similarity measure, and wherein the method further comprises generating a composite map image, wherein the features of the first map are spatially resolved with the features of the second map based on the determination of the spatial matching test.

Another arrangement described herein provides a computer implemented method for combining two or more maps, the method comprising receiving map data relating to one or more features in a first map and one or more features in one or more further maps, quantifying the spatial similarity between the features in the first map and the features in the one or more further maps by adding a buffer area around each feature and calculating the extent to which said buffer areas intersect to determine if there are features common to the first map and the one or more further maps, and spatially resolving the features of the first map with the features of the one or more further maps to generate a composite map image comprising all of said features, wherein the features common to said maps have been spatially resolved so as to be represented by a single feature.

In another example, a computer implemented method for combining two or more maps is provided, the method comprising receiving map data relating to a first map comprising one or more features and map data relating to a second map comprising one or more features, performing a spatial matching test to identify one or more features of the first map that are present in the second map, the test comprising the steps of (i) identifying a first feature from the first map, (ii) identifying a second feature from the second map, (iii) adding a first buffer area around the first feature, (iv) adding a second buffer area around the second feature, (v) calculating a first similarity measure based on the amount of overlap between the first buffer area and the second buffer area, and (vi) determining whether the first and second features relate to the same geographical configuration in dependence on the first similarity measure.

In this case, the method is used solely to measure the accuracy of one map dataset against another map dataset. For example, a digital map provider known to have accurate and up to date map data may be approached by a third party to assess the accuracy of their own map data and to ensure that no important features are missing therefrom (or vice versa).

BRIEF DESCRIPTION OF THE DRAWINGS

Further features and advantages of aspects described herein will become apparent from the following description of embodiments thereof, presented by way of example only, and by reference to the drawings, wherein;

FIG. 2-b illustrate a further prior art method for spatial matching;

DETAILED DESCRIPTION

As described above, FIGS. 1a-b exemplify the problems with the standard intersection method previously used to spatially match alternative vector features.

Figure 1A:
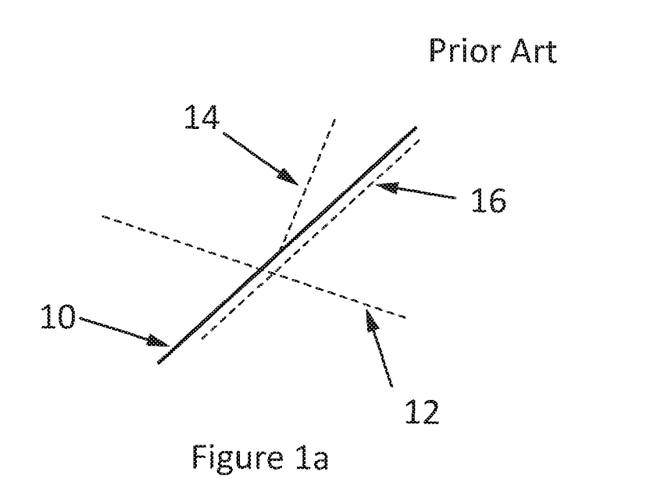
FIGS. 1a-b illustrate a first prior art method for spatial matching.
Figure 1B:
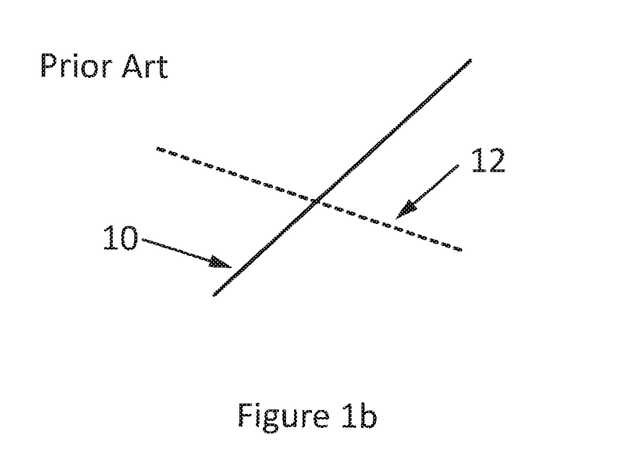

FIG. 1a shows a reference feature 10, and three test features 12, 14, 16 presented as possible matches for the reference feature 10. The reference feature 10 may represent a topographical map feature in an area of interest that is already stored in the GIS system being used to produce the map, whilst the test features 12, 14, 16 may represent third party map data for the area of interest. As one example, the reference feature 10 may represent a portion of train line in a particular geographic location, and test features 12, 14, 16 may represent portions of train line known to be in that location as provided by the manufacturer of the train line. To test for a spatial match, the GIS system inspects the test features 12, 14, 16 for one that intersects the reference feature 10. Consequently, as shown by FIG. 1b, the result is that the third test feature 16 perpendicular to the reference feature 10 is shown to be the closest match since this is the only test feature that intersects the reference feature 10. However, this is clearly not the closest spatial match to the reference feature 10, and thus this intersection method is clearly unreliable.

Figure 2B:
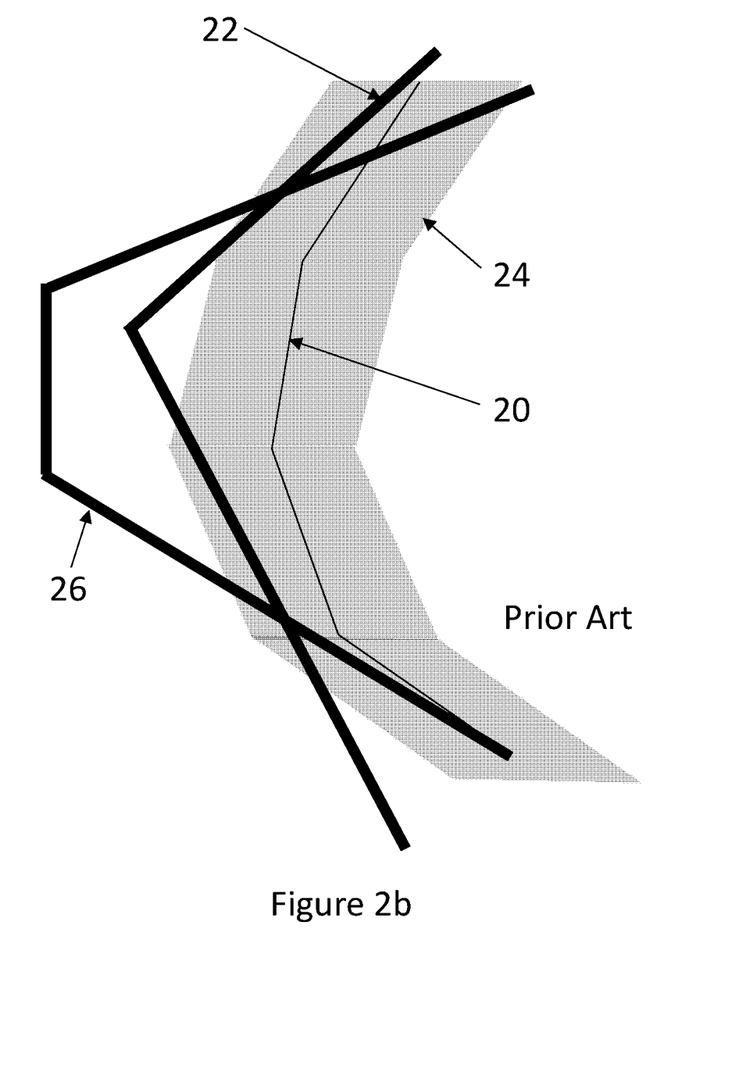

FIG. 2a illustrates a further prior art method of spatial matching, as developed in the previously mentioned paper by Goodchild et al. In this method, a reference feature 20 from a first dataset is compared with a first test feature 22 from a second dataset. To do this, the reference feature 20 is provided with a buffer 24 of width x, the width being chosen according to the scale of the feature represented by the reference feature 20. The buffer 24 is then intersected with the first test feature 22, and the proportion of the test feature 22 lying within the buffer 24 is calculated. Whilst this gives a more quantitative and realistic assessment of the similarity between a test feature and a reference feature than the method illustrated by FIGS. 1a-b, the method is still prone to unreliable results, particularly when multiple test features lie within the vicinity of the reference feature 20. For example, as shown in FIG. 2b, a second test feature 26 has been included which also intersects the buffer 24 a substantial amount. Consequently, a positive match will be returned for both test features 22 and 26 as they both intersect with the buffer 24 by a similar amount, but the extent of the intersection is not quantified in a meaningful way such that it is known definitively which is the best match. Therefore, when there is more than one positive match, it is possible to be left in one of three situations; 1) where one test feature intersects the buffer by a larger proportion than other test features and is the actual correct match; 2) where two or more test features intersect a reference feature by substantially the same amount (so no indication of which is the correct match); and 3) where one test feature intersects the buffer by a larger proportion than other test features but isn't the correct match.

In this example, it is fairly self-evident from visual inspection that the first test feature 22 is spatially more similar to reference feature 20 than the second test feature 26. However, when analysing features on a scale of hundreds or thousands of kilometres, for example, in the case of a rail line or highway, it is not practical to manually inspect each map feature by eye every time the method outputs more than one positive match to thereby avoid either situation 2) or 3) described above.

Furthermore, as this method will often provide more than one positive spatial match, it is not possible to spatially resolve the datasets from which the features originated in an effective and accurate way. In this example, without selecting one of the test features 22, 26 manually, a likely outcome is a spatially resolved feature that would fall somewhere between the two test features 22, 26, or a spatially resolved feature that matches the incorrect feature.

Figure 3A:
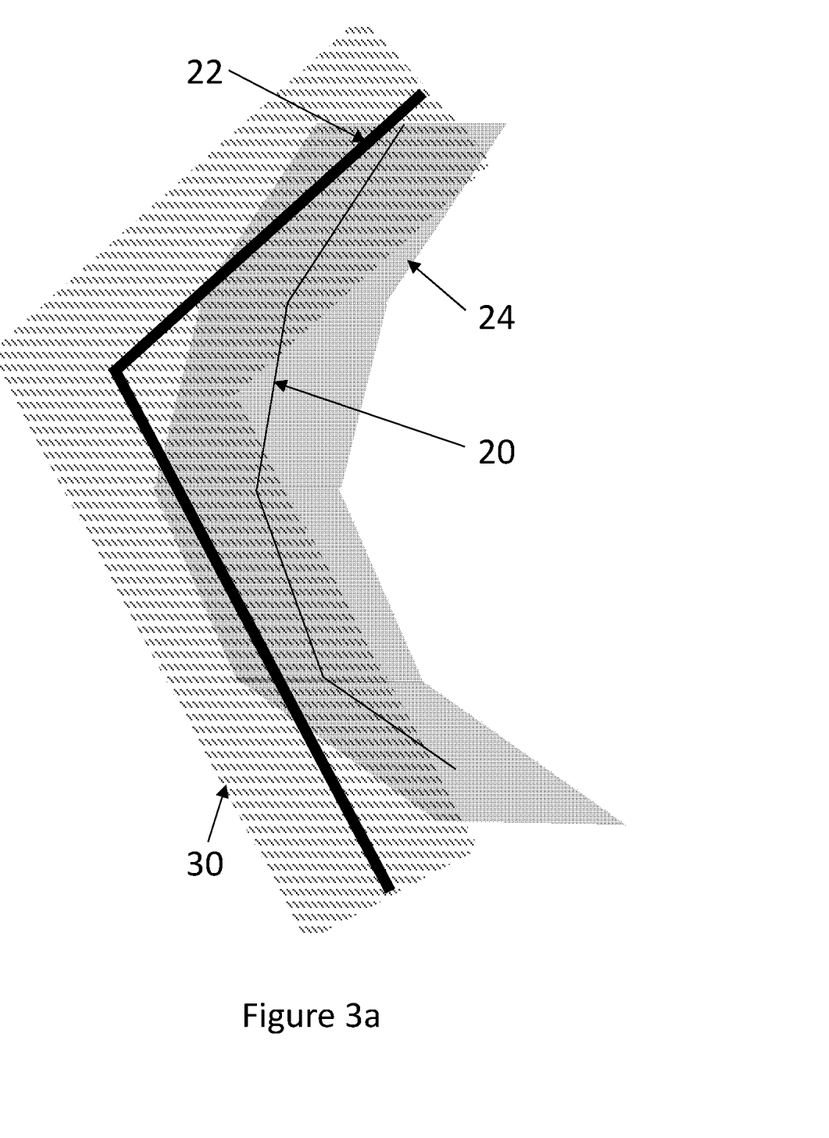
FIGS. 3a-b is an example illustrating the method of one or more illustrative aspects described here.
Figure 3B:
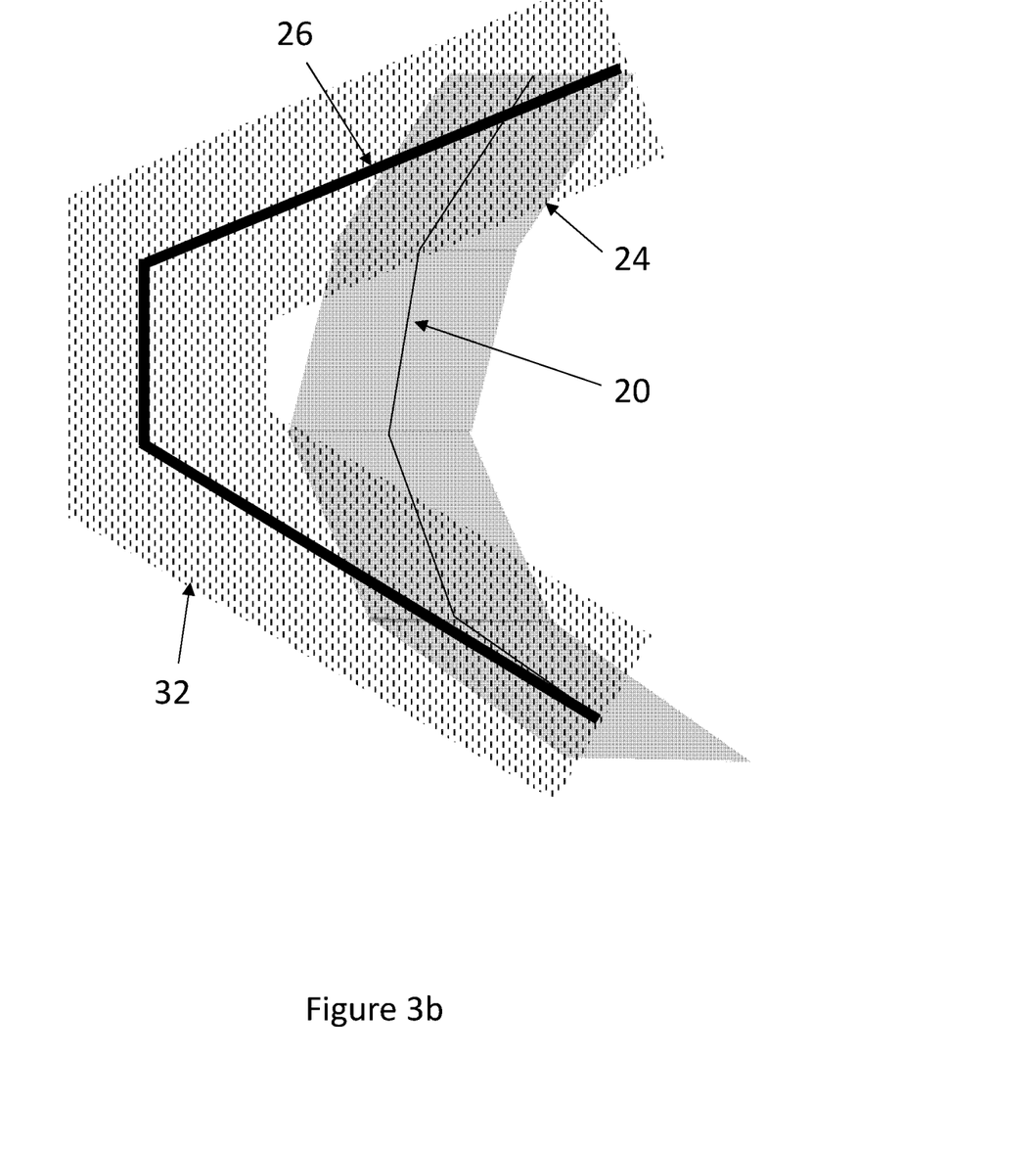
Figure 5:
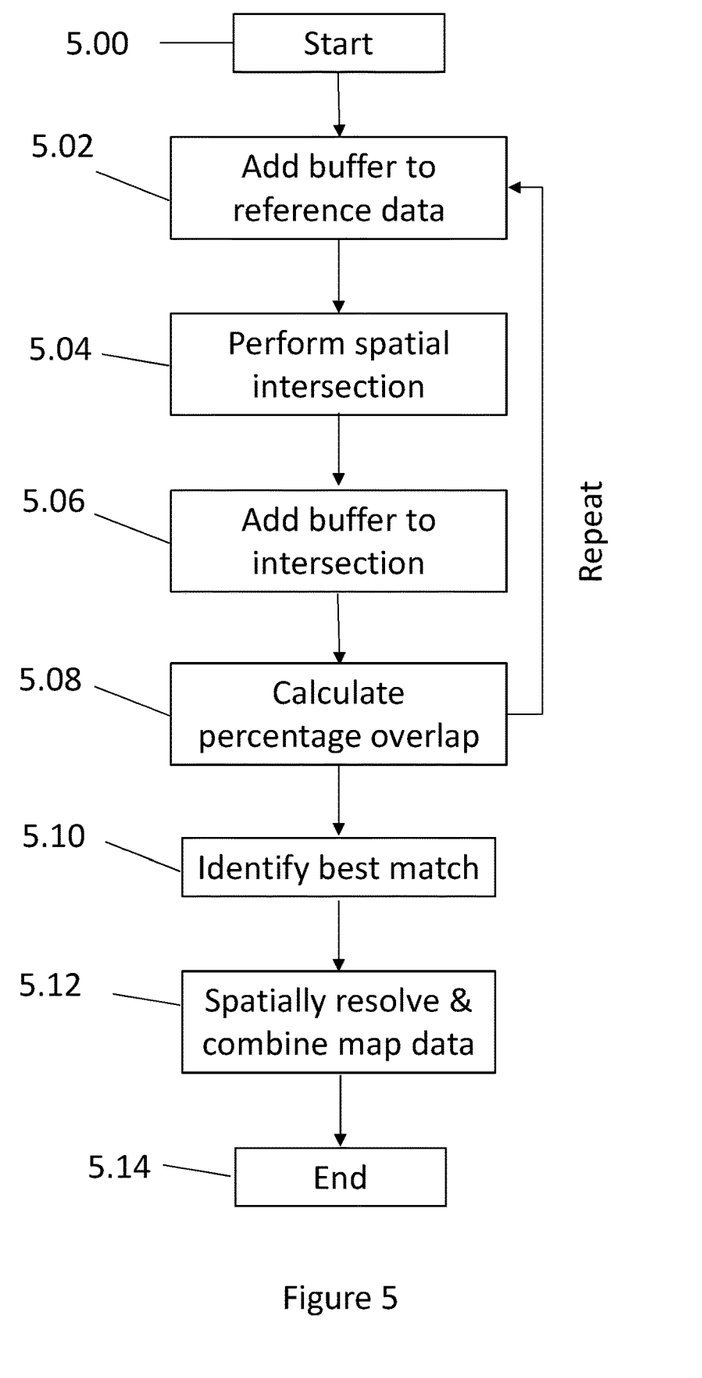
FIG. 5 is a flow chart showing the steps of the method of one or more illustrative aspects described here.

To address this problem, a method of spatial matching as illustrated by FIG. 5 is proposed, and as further illustrated by way of example in FIGS. 3*a* and 3*b*. As before, a buffer area 24 is added to a reference feature 20 (step 5.02) from a first map dataset, the buffer 24 then being compared with a first test feature 22 (step 5.04) that is known to be in the same geographical area. For example, the reference feature 20 may represent part of a cycle path stored in a first map dataset of the master GIS system, that is, it represents a cycle path on a first map. The first test feature 22 may be taken from a second map dataset containing cycle route information provided by a Local Authority, that is, it represents a cycle path in a corresponding geographical region as represented on a second map. A second buffer area 30 is then added to the first test feature 22 (step 5.06). The amount by which the first and second buffers 24, 30 overlap is then calculated as a percentage of the reference features buffer 24 area. As such, the proportion of the first buffer 24 that is intersected by the second buffer 30 is determined, rather than the proportion of the test feature that lies within the buffer.

Steps 5.02 to 5.08 may then repeated for as many test features as necessary. For example, as shown in FIG. 3*b*, a second test feature 22 that is also in the same geographical region as the reference feature 20 is tested. Here, the second test feature 22 may also be taken from the dataset containing cycle route information, representing a second cycle path on the second map. Alternatively, the second test feature 22 could be taken from a third map dataset, for example, a second cycle path on a third map. A third buffer 32 is placed around the second test feature 22 and the proportion of overlap with the first reference buffer 24 is calculated. This similarity measure, that is, the proportion of overlap of each of the test features 22, 26 can then be compared to determine which test feature 22, 26 is the better spatial match (step 5.10). In this example, it can be seen by visual inspection that the proportion of overlap for the second test feature 26 is less than that of the first test feature 22, and is therefore not a better spatial match. However, in cases where there are multiple test features within a small geographical area, this method provides a more definitive measure of which is the best spatial match. Therefore, the probability that the results will fall in to one of situations 2) and 3) as described above is significantly diminished.

The size of the buffers 24, 30, 36 are chosen based on a number of factors, such as what topographical feature the feature represents and what level of accuracy is required. For example, for a highway network where there are several sections of road within a relatively small area, a small buffer width, for example, a width of 2 to 5 metres, will be required. If the buffer width is too big, this may result in one or more of the test features being fully encapsulated by the reference buffer with 100% buffer overlap. Conversely, if the buffer is too small, the test features may not overlap the reference buffer at all. A larger buffer may be required, for example, in cases where one map dataset has a large scale, for example, a 1:10000 or 1:25000 scale map, and the second map dataset has been digitised to a lower order of accuracy than the large scale map. In such cases, a buffer width of 20 to 50 metres may be required.

In many cases, an acceptance level is applied so as to set the minimum value that the percentage overlap can be and still output a positive match. For example, a positive match may be anything having a percentage overlap of 65% or over. If all of the test features are below this value, then none of them will be considered a positive match. If two or more of the test features are above this value, then the test feature with the highest percentage overlap will be considered the best spatial match.

Once a test feature has been identified as being the best spatial match, the geometry of the reference feature can be spatially resolved with the geometry of the test feature (step 5.12) in order to combine the topographic map features of both map datasets into a new composite map dataset for generating a new composite map image. In the example shown in FIGS. 3*a* and 3*b*, the reference feature 20 will be spatially resolved with the first test feature 22, which may be done in any suitable way. For example, the reference feature 20 may be spatially resolved with the first test feature 22 such that the feature is represented on the composite map image as a single feature having the same shape and geographical position as either the reference feature 20 as it is represented on the first map or the first test feature 22 as its is represented on the second map, preferably, whichever one is known to have the most spatial accuracy. Alternatively, a mean position of the reference feature 20 and the first test feature 22 may be determined, and the feature represented on the composite image map based on this mean. In the event that more than one test feature is found to match a reference feature, that is, their buffer areas overlap that of the reference feature by substantially the same amount, then all of these features will be spatially resolved as a single feature on the composite map image.

If no spatial match is found in the first dataset for the second test feature 26, that is, the feature it represents is not present on the first map, the second test feature 26 may be added to the new composite map data set as a new feature. As such, the final output will be a new map dataset comprising a new spatially resolved feature based on the reference feature 20 and the first test feature 22, and a new feature based on the second test feature 26. This spatially matched dataset can thus be used to produce a new composite map image that ensures that all of the features of the first and second map are included and that those features which are common to both maps are spatially resolved. As such, using this quantitative spatial match, two or more maps can be overlaid, for example, by spatially aligning the two or more maps based on a known geographical reference co-ordinate, the features compared to find matching features and then spatially resolved to produce a composite map image that contains all of the features of all the maps.

Figure 4A:
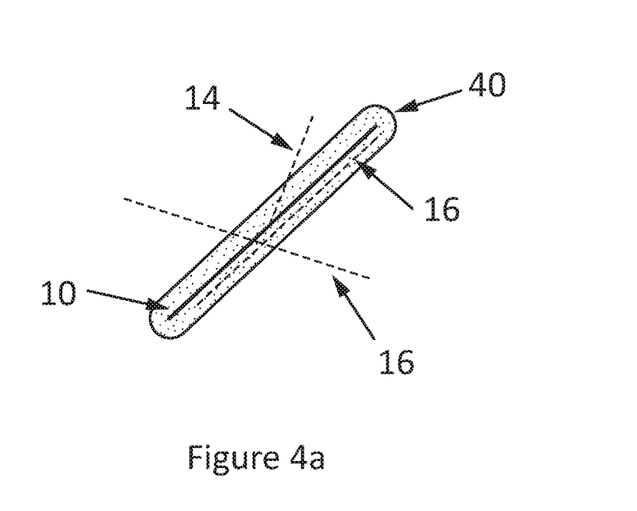
FIGS. 4a-d is a further example illustrating the method of one or more illustrative aspects described here.
Figure 4B:
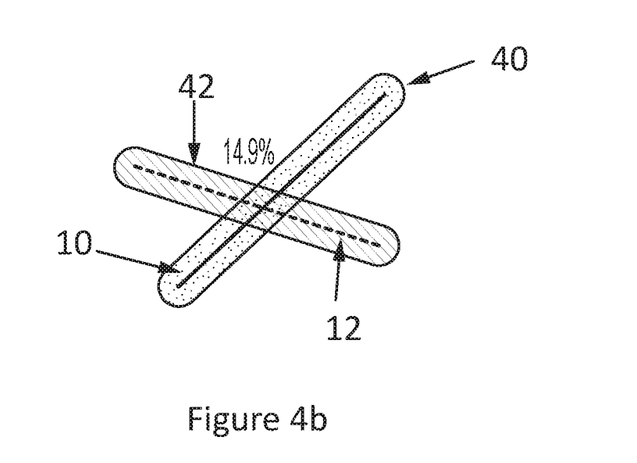
Figure 4C:
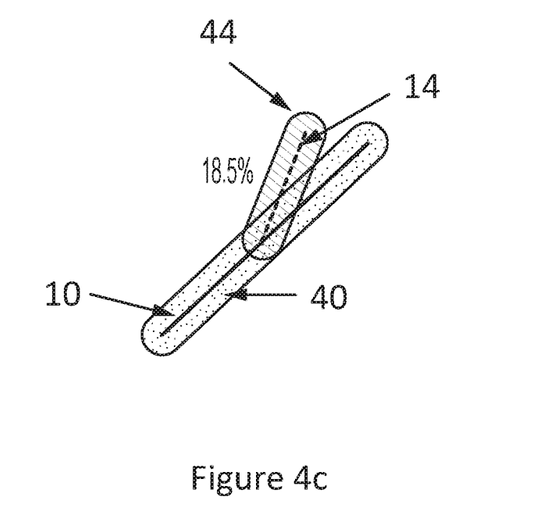
Figure 4D:
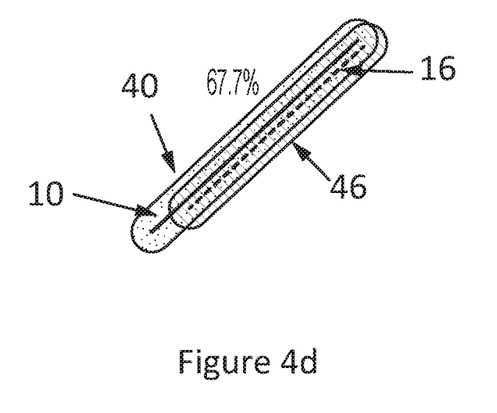

A further illustrative aspect is shown by FIGS. 4*a*-*d* based on the example shown in FIG. 1*a*. In FIG. 4*a*, a first buffer 40 is added to the reference feature 10 and intersected with a first test feature 12, a second test feature 14, and a third test feature 16 (step 5.02 and 5.04). Step 5.06 and 5.08 are then performed for each of the test features 12, 14 and 16. As shown in FIG. 4b, a second buffer 42 is applied to the first test feature 12, the amount of overlap between the first buffer 40 and second buffer 42 being calculated as 14.9%. Setting the minimum acceptance level at 65%, this is clearly not a good spatial match. In FIG. 4c, a third buffer 44 is applied to the second test feature 14, the amount of overlap between the first buffer 40 and third buffer 44 being calculated as 18.5%, which is again below the satisfactory acceptance level. In FIG. 4d, a fourth buffer 46 is applied to the third test feature 16, the amount of overlap between the first buffer 40 and fourth buffer 46 being calculated as 67.7%. This is above the given acceptance level, and can therefore be considered a good spatial match. Therefore, it is clear from these results that the third test feature 16 is the most similar to the reference feature 10 in its spatial extent.

As in the previous example, the third test feature 16 can be used to spatially resolve the reference feature 10, for example, by re-writing the reference feature 10 so that it is identical to the third test feature 16, whilst the first and second test features 12, 14 can be added to the composite map dataset as new features.

Figure 6:
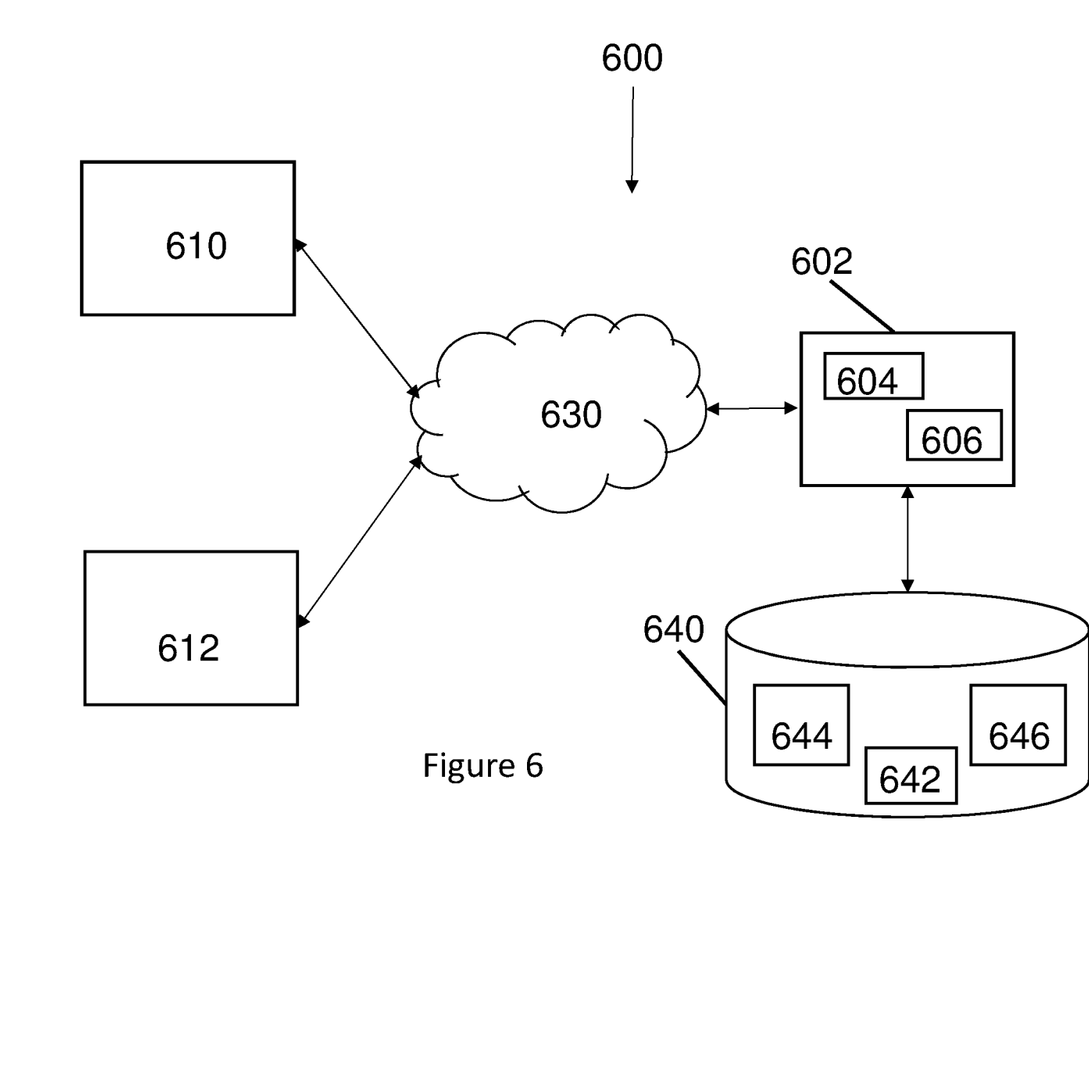
FIG. 6 is a system diagram showing the system used to carry out the method of one or more illustrative aspects described here.

An example of the system used to implement embodiments described herein is shown in FIG. 6. Generally, the system described below implements the various steps and processes as described in detail above, and reference should be made to the above when considering the various steps and processes described below.

FIG. 6 shows the system 600 comprising a map server 602 in communication with third party servers 610, 612 via a network 630 through a communications interface 604. Map server 602 comprises a processor 606 arranged to carry out computing operations, and is also in communications with a core server 640. The core server 640 runs different software implemented modules which carry out different tasks or provide particular data when required by the processor 606. More specifically, master map module 642 contains the topographic map data used to generate the digital map. This topographic map data provides the reference feature data used in the above described method. Spatial matching module 644 is arranged to carry out the steps necessary to determine matching features. Upon identifying matching features, a map generating module 646 is arranged to combine the map data and spatially resolve any matching features to thereby produce new topographic map data.

The map server 602 is arranged to receive alternative map data via network 630 from the third party servers 610, 612, from which test features are to be extracted for input to the spatial matching module 644. Map server 602 communicates the received map data to the core server 640, which extracts the relevant parts of the topographical map data required from the master map module 642. As such, the topographical map data from the master map module 642 relates to a first digital map, whilst the map data from the third party servers 610, 612 relates to one or more further digital maps. The spatial matching module 644 is then arranged to carry out spatial matching methods described above based on the map data extracted from the master map module 642 and the map data received from the third party servers 610, 612. The spatial matching module 644 then outputs information to the map generating module 646 including details of any spatial matches and of any third party data that has not been matched with any of the topographical map data (or vice versa). The map generating module 646 then combines the topographical map data with the third party map data based on this output to produce spatially resolved topographical map data which is then stored in the master map module 642. This new topographical map data can then be communicated to the map server 602 where it is used to generate a new digital map based on the original dataset and the received third party datasets. As such, the map generating module 646 combines the features of the topographical map and the third party maps, spatially resolving the map data common to both maps as described above based on the output of the spatial matching module 644. Therefore, the map generating module 646 produces a composite map image that contains all of the features of the topographical map and the third party maps with improved accuracy. The resulting composite map image can then be distributed to the third party servers 610, 612, displayed to a user on a display (not shown), or sent over a network to a remote user device, where it is then rendered and displayed to an end user. With such an arrangement, a composite map image can be obtained from two or more maps of a corresponding geographic area, with common features on the maps resolved such that they only appear once.

Various modifications, whether by way of addition, deletion and/or substitution, may be made to all of the above described embodiments to provide further embodiments, any and/or all of which are intended to be encompassed by the appended claims.

The invention claimed is:

1. A computer implemented method for combining two or more maps, the method comprising:
   receiving, by a data processing device, map data relating to a first map comprising one or more features and map data relating to a second map comprising one or more features;
   performing, by the data processing device a spatial matching test to identify one or more features of the first map that are present in the second map, the test comprising the steps of:
   i) identifying a first feature from the first map, wherein the first feature is representative of a first geographical configuration;
   ii) identifying a second feature from the second map, wherein the second feature is representative of a second geographical configuration;
   iii) adding a first buffer area around the first feature;
   iv) adding a second buffer area around the second feature;
   v) calculating a first similarity measure based on the amount of overlap between the first buffer area and the second buffer area; and
   vi) determining whether the first and second features relate to the same geographical configuration in dependence on the first similarity measure; and
   generating, by the data processing device, a composite map image, wherein the features of the first map are spatially resolved with the features of the second map based on the determination of the spatial matching test.

2. A method according to claim 1, wherein the spatial resolution is such that, upon determining that the first and second features relate to the same geographical configuration, the first and second features are represented as a single feature on the composite map image.

3. A method according to claim 2, wherein the geographical position of the single feature on the composite map image is the original geographical configuration represented by the first or second feature on the first or second map respectively.

4. A method according to claim 2, wherein the geographical configuration of the single feature on the composite map image is a mean of the original geographical configurations represented by the first and second feature on the first and second maps respectively.

5. A method according to claim 1, wherein the spatial resolution is such that, upon determining that the first and second features do not relate to the same geographical configuration, the first and second features are represented as separate features on the composite map image based on their original geographical configurations on the first and second map respectively.

6. A method according to claim 1, wherein the spatial matching test further comprises spatially aligning the first map with the second map based on at least one known geographical position as a reference point.

7. A method according to claim 1, wherein the second feature is determined to have the same geographical configuration as the first feature if the similarity measure is above a predetermined level, wherein the predetermined level is at least 65%.

8. A method according to claim 1, wherein the first buffer area has a first width.

9. A method according to claim 8, wherein the first width is selected in dependence on a property of the first feature, wherein the property is the size of the first feature in at least one dimension.

10. A method according to claim 1, wherein the second buffer area has a second width.

11. A method according to claim 10, wherein the second width is selected in dependence on a property of the second feature, wherein the property is the size of the second feature in at least one dimension.

12. A method according to claim 8, wherein the second buffer area has a same width as the first buffer area.

13. A method according to claim 1, the spatial matching test further comprising:
   Identifying, by the data processing device, a third feature from the second map or a third map;
   adding a third buffer area around the third feature;
   calculating, by the data processing device, a second similarity measure based on the amount of overlap between the first buffer area and the third buffer area;
   comparing, by the data processing device, the second similarity measure to the first similarity measure to determine if the second feature or the third feature is closer in geographical configuration to the first feature; and
   spatially resolving the first, second and third features based on the comparison.

14. A non-transitory computer readable medium storing computer readable instructions that, when executed by a data-processing device, cause the device to perform the following:
   a) receive, by the data processing device, map data relating to a first map comprising one or more features and map data relating to a second map comprising one or more features;
   b) perform, by the data processing device, a spatial matching test to identify one or more features of the first map that are present in the second map, the test comprising:
      i) identifying a first feature from the first map, wherein the first feature is representative of a first geographical configuration;
      ii) identifying a second feature from the second map, wherein the second feature is representative of a second geographical configuration;
      iii) adding a first buffer area around the first feature;
      iv) adding a second buffer area around the second feature;
      v) calculating a first similarity measure based on the amount of overlap between the first buffer area and the second buffer area; and
      vi) determining whether the first and second features relate to the same geographical configuration in dependence on the first similarity measure;
   the device being further arranged to:
   c) generate, by the data processing device, a composite map image, wherein the features of the first map are spatially resolved with the features of the second map based on the determination of the spatial matching test.

15. A map image processing system, comprising:
   a processor; and
   a computer readable medium storing one or more instruction(s) arranged such that when executed the processor is configured to:
   a) receive map data relating to a first map comprising one or more features and map data relating to a second map comprising one or more features;
   b) perform a spatial matching test to identify one or more features of the first map that are present in the second map, the test comprising the steps of:
      i) identifying a first feature from the first map, wherein the first feature is representative of a first geographical configuration;
      ii) identifying a second feature from the second map, wherein the second feature is representative of a second geographical configuration;
      iii) adding a first buffer area around the first feature;
      iv) adding a second buffer area around the second feature;
      v) calculating a first similarity measure based on the amount of overlap between the first buffer area and the second buffer area; and
      vi) determining whether the first and second features relate to the same geographical configuration in dependence on the first similarity measure;
   the processor being further caused to:
   c) generate a composite map image, wherein the features of the first map are spatially resolved with the features of the second map based on the determination of the spatial matching test.

16. A system according to claim 15, wherein the spatial resolution is such that, upon determining that the first and second features relate to the same geographical configuration, the first and second features are represented as a single feature on the composite map image.

17. A system according to claim 16, wherein the geographical position of the single feature on the composite map image is the original geographical configuration represented by the first or second feature on the first or second map respectively.

18. A system according to claim 16, wherein the geographical configuration of the single feature on the composite map image is a mean of the original geographical configurations represented by the first and second feature on the first and second maps respectively.

19. A system according to claim 15, wherein the spatial resolution is such that, upon determining that the first and second features do not relate to the same geographical configuration, the first and second features are represented as separate features on the composite map image based on their original geographical configurations on the first and second map respectively.

20. A system according to claim 15, wherein the spatial matching test further comprises spatially aligning the first map with the second map based on at least one known geographical position as a reference point.

\* \* \* \* \*